US010755322B2

(12) United States Patent
Kilpatrick

(10) Patent No.: US 10,755,322 B2
(45) Date of Patent: Aug. 25, 2020

(54) BLOCKCHAIN-BASED SOFTWARE INSTANCE USAGE DETERMINATION

(71) Applicant: Red Hat, Inc., Raleigh, NC (US)

(72) Inventor: Justin M. Kilpatrick, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 224 days.

(21) Appl. No.: 15/438,922

(22) Filed: Feb. 22, 2017

(65) Prior Publication Data

US 2018/0240165 A1 Aug. 23, 2018

(51) Int. Cl.
*G06Q 40/04* (2012.01)
*G06Q 30/04* (2012.01)
*H04L 9/32* (2006.01)
*G06Q 20/38* (2012.01)
*G06Q 20/40* (2012.01)

(52) U.S. Cl.
CPC .................................... *G06Q 30/04* (2013.01)

(58) Field of Classification Search
CPC .................................. G06Q 40/04; H04L 9/32
USPC ............................................................ 705/34
See application file for complete search history.

(56) References Cited

U.S. PATENT DOCUMENTS 7,155,414 B2 12/2006 Barritz et al.
7,707,072 B2 4/2010 Pierce
9,129,052 B2 * 9/2015 Brookbanks ........ H04L 41/5009
2004/0148257 A1 7/2004 Garcia
2009/0012885 A1 1/2009 Cahn
2009/0300608 A1 * 12/2009 Ferris .................. G06F 9/45558 718/1
2012/0130873 A1 5/2012 Morgan
2016/0012465 A1 1/2016 Sharp
2017/0046652 A1 * 2/2017 Haldenby .......... G06Q 20/0655
2018/0054491 A1 * 2/2018 Mankovskii .......... H04L 67/142
2018/0060836 A1 * 3/2018 Castagna ............... G06Q 20/10

FOREIGN PATENT DOCUMENTS

WO 2001013273 A2 2/2001

OTHER PUBLICATIONS

Author Unknown, "Enterprise scalability coupled with the best business intelligence architecture," GoodData Corporation, available at least as early as Jan. 3, 2017, 4 pages, https://www.gooddata.com/platform/scalable-distribution.
Author Unknown, "ELI5 triple entry accounting: r/Bitcoin," Reddit, May 8, 2015, 58 pages, https://www.reddit.com/r/Bitcoin/comments/35az5h/eli5_triple_entry_accounting/?st=ixkaq2ge&sh=ca5de4ae.
Author Unknown, "Red Hat Enterprise Virtualization for Servers: Pricing & Licensing Guide," Red Hat, Inc., Oct. 30, 2009, 14 pages.
Author Unknown, "Red Hat Enterprise Virtualization for Servers: Pricing Quickguide," Red Hat, Inc., Apr. 2011, 2 pages.

* cited by examiner

*Primary Examiner* — Luna Champagne
(74) *Attorney, Agent, or Firm* — Withrow & Terranova PLLC

(57) ABSTRACT

Blockchain-based software instance usage determination is disclosed. A span identifier that identifies a span is received. A blockchain is traversed to identify a plurality of authorized transactions generated within the span, the blockchain including a plurality of blocks of authorized transactions, each authorized transaction authorizing execution of a software instance. Information about software instances identified in the plurality of authorized transactions is output.

11 Claims, 10 Drawing Sheets

BLOCKCHAIN-BASED SOFTWARE INSTANCE USAGE DETERMINATION

TECHNICAL FIELD

The examples relate generally to determining software usage and, in particular, to blockchain-based software instance usage determination.

BACKGROUND

Software products have often been licensed on an annual basis. A predetermined fee is paid, and the fee allows usage of the software product for one year. Increasingly, however, and in particular in cloud-computing environments for example, software products are being licensed on a time and/or usage basis. Fees are thus based on a number of uses of a software product, and/or a total amount of time the software product was used, over a particular period of time.

SUMMARY

The examples disclosed herein implement a blockchain-based software instance usage system. The examples record, in a blockchain, a billing rules transaction that identifies usage rules for one or more software instance types for a timeframe. Authorized transactions that identify software instances that have been authorized to execute during the timeframe are also recorded in the blockchain. Because blocks in the blockchain, for practical purposes, cannot subsequently be modified so long as a sufficiently robust consensus method is used to create the blocks, the blockchain accurately records both the actual software instance usage and the rules under which the usage occurred. Among other advantages, the examples can be used to determine and/or validate license fees that may be owed to a provider of the software instances. The examples can also be used to dynamically determine whether to authorize an activation request transaction that requests authorization to execute a software instance, based on a current total usage of software instances at the time of the request.

In one example a method for generating an accounting of software instance usage is provided. The method includes receiving, by a computing device including a processor device, a span identifier that identifies a span. The method further includes traversing, by the computing device, a blockchain to identify a plurality of authorized transactions generated within the span, the blockchain including a plurality of blocks of authorized transactions, each authorized transaction authorizing execution of a software instance. The method includes outputting information about software instances identified in the plurality of authorized transactions.

In another example a computing device is provided. The computing device includes a memory and a processor device coupled to the memory. The processor device is to receive a span identifier that identifies a span. The processor device is further to traverse a blockchain to identify a plurality of authorized transactions generated within the span, the blockchain including a plurality of blocks of authorized transactions, each authorized transaction authorizing execution of a software instance. The processor device is further to output information about software instances identified in the plurality of authorized transactions.

In another example a computer program product for generating an accounting of software instance usage is provided. The computer program product is stored on a non-transitory computer-readable storage medium and includes instructions to cause a processor device to receive a span identifier that identifies a span. The instructions further cause the processor device to traverse a blockchain to identify a plurality of authorized transactions generated within the span, the blockchain including a plurality of blocks of authorized transactions, each authorized transaction authorizing execution of a software instance. The instructions further cause the processor device to output information about software instances identified in the plurality of authorized transactions.

In another example a method is provided. The method includes receiving a billing rules transaction that includes an effective span during which the billing rules transaction is effective, at least one software instance type of a plurality of different software instance types, and a fee associated with execution of a software instance of the at least one software instance type. The method further includes storing the billing rules transaction in a block in a blockchain, the blockchain including blocks of authorized transactions. The method further includes, subsequent to storing the billing rules transaction, receiving a first authorization request transaction that requests authorization of a first software instance of the at least one software instance type. The method further includes authorizing the first authorization request transaction or denying the first authorization request transaction based at least in part on the fee.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
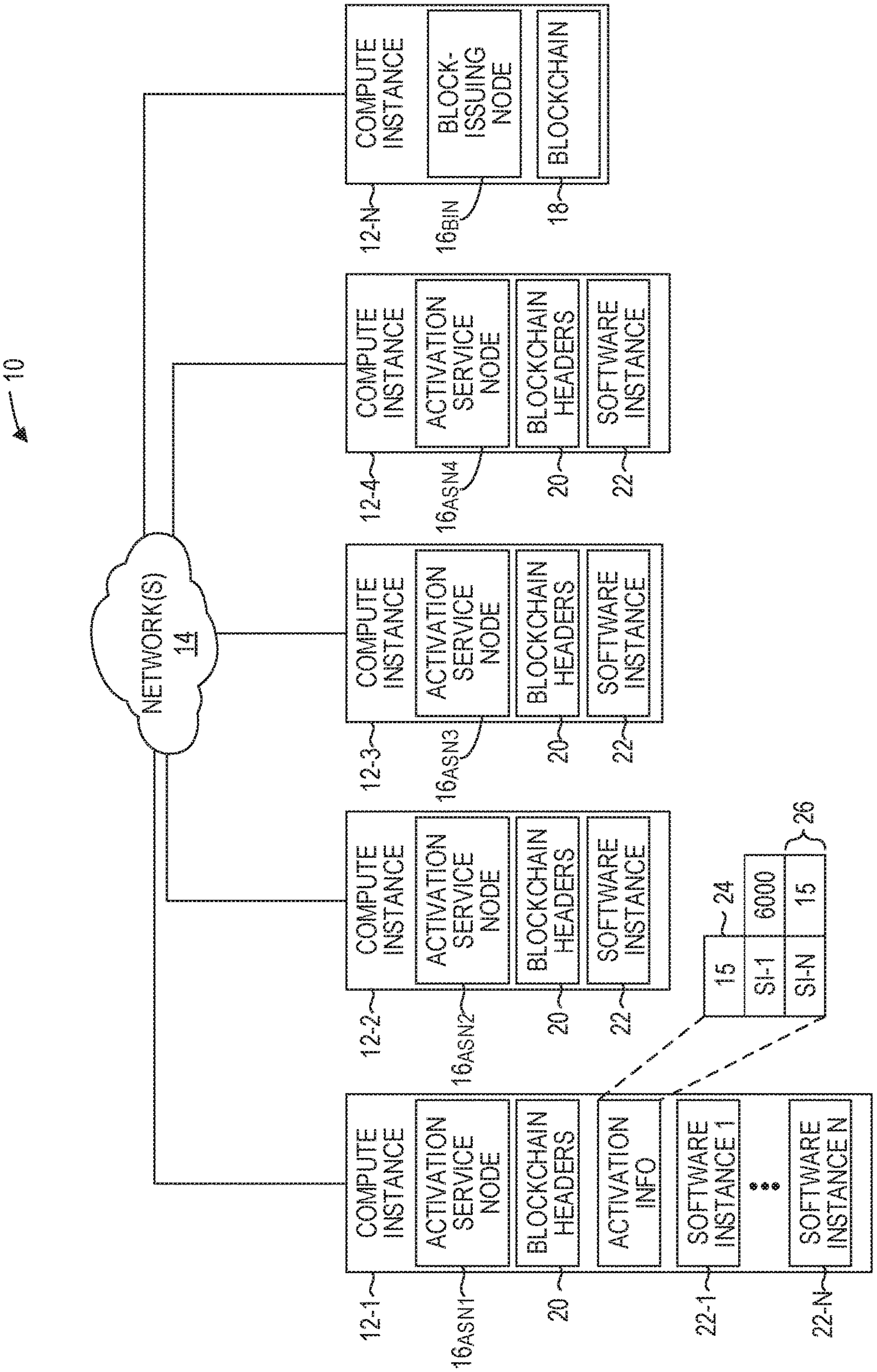
FIG. 1 is a block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first authorization request transaction" and "second authorization request transaction," and does not imply a priority, a type, an importance, or other attribute, unless otherwise stated herein. As used herein and in the claims, the articles "a" and "an" in reference to an element refers to "one or more" of the element unless otherwise explicitly specified.

The phrase "software instance," as discussed herein, refers to a single executing occurrence of a software-implemented service. A software instance is typically a discrete software component, such as an operating system, a database, a business application, a middleware component, and the like.

Software products have often been licensed on an annual basis. A predetermined fee is paid, and the fee allows usage of the software product for one year. Increasingly, however, and in particular in cloud-computing environments for example, software products are being licensed on a time and/or usage basis. Fees are thus based on simultaneous active instances of a software product, and/or a total amount of time the software product was used, over a particular period of time.

It can be challenging for a vendor of software products to establish the usage of software instances by a customer, particularly when the software instances are being executed repeatedly over time, and on a demand basis, and when the network on which the software instances are executing may not be owned and operated by the vendor. It can be equally challenging for a customer to establish such usage because the customer may not have the appropriate infrastructure in place to keep track of such information.

The examples disclosed herein implement a blockchain-based provable software usage system that contains the actual license fees in effect for an effective span, as well as the authorized transactions that authorize the execution of software instances during the effective span. Thus, the examples result in a provably fair mechanism by which one can determine actual software instance usage and the associated license fees, in a manner that is impossible, or impracticable, to alter or otherwise manipulate to reflect false information. In particular, the disclosed examples store, in a blockchain, a billing rules transaction that identifies usage rules for one or more software instance types for a timeframe. Blocks added to the blockchain contain a hash of each previous block in the blockchain, and are added using a protocol, such as a proof of work protocol, that eliminates, or substantially inhibits, the ability to subsequently alter blocks that have been stored to the blockchain. Authorized transactions that identify software instances that have been authorized to execute during the timeframe are also recorded in the blockchain. Among other advantages, the examples can be used to determine and/or validate license fees that may be owed to a provider of the software instances. The examples can also be used to dynamically determine whether to authorize an activation request transaction that requests authorization to execute a software instance, based on a current total usage of software instances at the time of the request.

As used herein, a "blockchain" refers to a decentralized database that maintains a list of ordered records ("blockchain blocks") that, once recorded, are resistant to retroactive modification. An example of a blockchain-based technology is the payment network Bitcoin (bitcoin.org).

A software instance refers to a single executing occurrence of a software-implemented service that runs on or as part of a computing instance, and is typically a discrete software component, such as an operating system, a database, a business application, a middleware component, and the like. A licensed software instance refers to a software instance that is authorized to provide the software-implemented service.

FIG. 1 is a block diagram of an environment 10 in which examples may be practiced. The environment 10 includes a plurality of compute instances 12-1-12-N (generally, compute instances 12) communicatively coupled via one or more networks 14. A compute instance 12, as discussed herein, refers to a discrete runtime environment, and may comprise a physical machine configured to run an operating system, or may comprise a virtual machine that emulates a physical machine. A virtual machine typically runs a guest operating system in conjunction with a virtual machine monitor, such as a hypervisor, that is configured to coordinate access to physical resources of a physical machine, such as a memory and a processor device, by the virtual machines running on the physical machine. A compute instance 12 thus, whether a physical machine or a virtual machine, includes a memory and a processor device. While for purposes of illustration five compute instances 12 are illustrated, the environment 10 may in practice have tens, hundreds, or thousands of compute instances 12.

A plurality of nodes $\mathbf{16}_{ASN1}$, $\mathbf{16}_{ASN2}$, $\mathbf{16}_{ASN3}$, $\mathbf{16}_{ASN4}$, and $\mathbf{16}_{BIN}$ (generally, nodes 16) make up a network of nodes 16 that utilize a blockchain 18 as a mechanism for requesting authorization for software instances and for granting such requests, as discussed in greater detail herein. A node 16 that provides activation services to software instances will be referred to herein as an activation service node $\mathbf{16}_{ASN}$, and a node 16 that authorizes requests for authorizations via the blockchain 18 will be referred to herein as a block-issuing node $\mathbf{16}_{BIN}$. While for purposes of illustration the activation service nodes $\mathbf{16}_{ASN}$ and the block-issuing node $\mathbf{16}_{BIN}$ are shown as separate nodes 16, in practice a node 16 may be both an activation service node $\mathbf{16}_{ASN}$ and a block-issuing node $\mathbf{16}_{BIN}$. Additionally, while for purposes of illustration only four activation service nodes $\mathbf{16}_{ASN}$ and one block-issuing node $\mathbf{16}_{BIN}$ are illustrated, in operation the environment 10 may utilize any number of activation service nodes $\mathbf{16}_{ASN}$ and any number of block-issuing nodes $\mathbf{16}_{BIN}$.

As each node 16 initiates on the respective compute instance 12, the node 16 discovers other nodes 16 via conventional discovery methods for a peer-to-peer network, and records the communication address of such other nodes 16. This may be facilitated, for example, by a central discovery service that can identify neighboring nodes 16 of a respective node 16. In other examples, a node 16 may broadcast a message onto the network 14 that identifies the respective node 16. Other nodes 16 that receive the identification message may respond with messages that identify such other nodes 16.

Subsequent communications between the nodes 16 are initiated via a broadcast mechanism wherein each node 16 initiates messages by broadcasting the messages to the list of nodes 16 known to the respective node 16. Each node 16 also receives messages from other nodes 16, and in turn, rebroadcasts such messages to other nodes 16. In this manner, messages propagate from one node 16 to another node 16 over time, even though there may be hundreds, or thousands, of nodes 16 in the network of nodes 16.

Activation service nodes $\mathbf{16}_{ASN}$, during initiation, typically obtain a history of blockchain headers 20 of the blockchain 18. This may be accomplished in any of a number of different ways. In one example, the activation service node $\mathbf{16}_{ASN}$ may download a copy of the blockchain 18, verify the entire blockchain 18, and retain only the blockchain headers 20 of the blockchain 18. In another example, the activation service node $\mathbf{16}_{ASN}$ may request an existing copy of the blockchain headers 20 from a trusted node 16, such as another activation service node $\mathbf{16}_{ASN}$ or a block-issuing node $\mathbf{16}_{BIN}$. In this example, assume that an activation service node $\mathbf{16}_{ASN}$ broadcasts a request for blockchain headers 20, and the request propagates to the block-issuing node $\mathbf{16}_{BIN}$ which, in response, then obtains the blockchain headers 20 of the blockchain 18 and broadcasts the blockchain headers 20. The blockchain headers 20 ultimately propagate to the requesting activation service node $\mathbf{16}_{ASN}$, which then stores the blockchain headers 20. The blockchain headers 20 utilize substantially less space than the blockchain 18. Among other advantages, having a complete history of the blockchain headers 20 of the blockchain 18 allows the activation service nodes $\mathbf{16}_{ASN}$ to verify that each subsequent blockchain block received originated from a valid block-issuing node $\mathbf{16}_{BIN}$.

An activation service node $\mathbf{16}_{ASN}$, such as the activation service node $\mathbf{16}_{ASN1}$, provides activation services for a software instance, such as, in this example, the software instances 22-1-22-N. As an example, as the software instance 22-N initiates, the software instance 22-N sends a request for authorization to the activation service node $\mathbf{16}_{ASN1}$. While for purposes of illustration the activation service node $\mathbf{16}_{ASN1}$ is shown as being a component of the same compute instance 12-1 as that of the software instance 22-N, in practice, the activation service node $\mathbf{16}_{ASN1}$ may be a component of another compute instance 12. A software instance 22 may access configuration information that identifies a particular activation service node $\mathbf{16}_{ASN}$ from which the software instance 22 should seek authorization, or a software instance 22 may be initiated with a parameter that directs the software instance 22 to a particular activation service node $\mathbf{16}_{ASN}$. In another example, a software instance 22 may have a search process that includes searching for and identifying a particular activation service node $\mathbf{16}_{ASN}$.

In some examples, the activation service node $\mathbf{16}_{ASN1}$ accesses a grace period 24 that identifies an execution grace period during which the software instance 22-N may execute prior to authorization. In this example, the grace period 24 is 15 seconds. The activation service node $\mathbf{16}_{ASN1}$ generates an execution timer 26 and sets the execution timer 26 to the grace period 24. In one example, the activation service node $\mathbf{16}_{ASN1}$ may also communicate to the software instance 22-N that the software instance 22-N may continue execution. In other examples, the software instance 22-N continues to execute without the need for a communication from the activation service node $\mathbf{16}_{ASN1}$ because the software instance 22-N will be subsequently directed to terminate by the activation service node $\mathbf{16}_{ASN1}$ if the software instance 22-N is not authorized by the end of the grace period 24. The activation service node $\mathbf{16}_{ASN1}$ then initiates a transaction to seek authorization for the software instance 22-N from the block-issuing node $\mathbf{16}_{BIN}$, as will be discussed in greater detail below with regard to FIG. 2. The activation service nodes $\mathbf{16}_{ASN2}$-$\mathbf{16}_{ASN4}$ operate identically or substantially similarly to the activation service node $\mathbf{16}_{ASN1}$ with respect to other software instances 22.

Figure 2A:
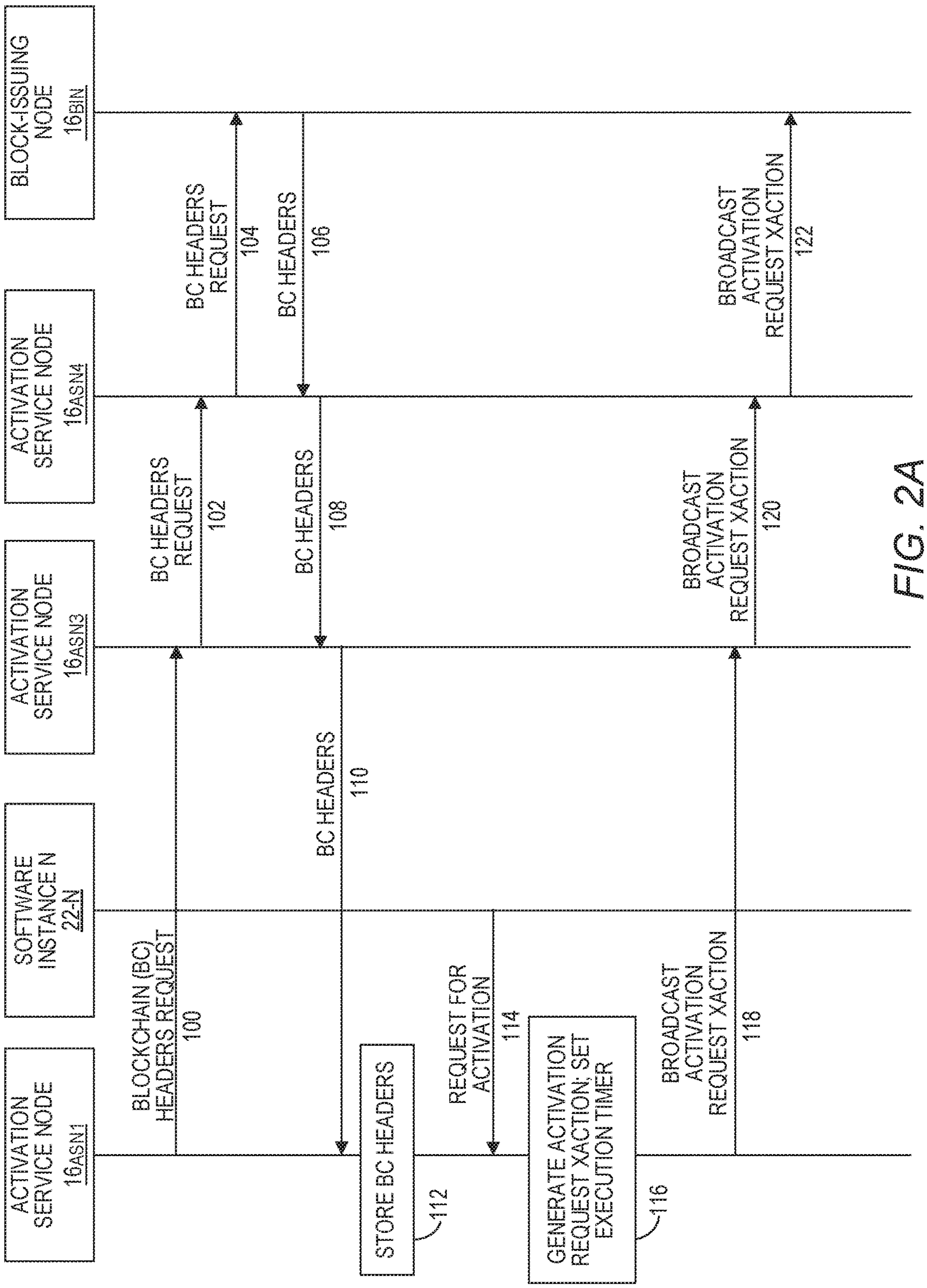
FIGS. 2A-2B are message flow diagrams of an example mechanism for granting an authorization request transaction according to one example.
Figure 2B:
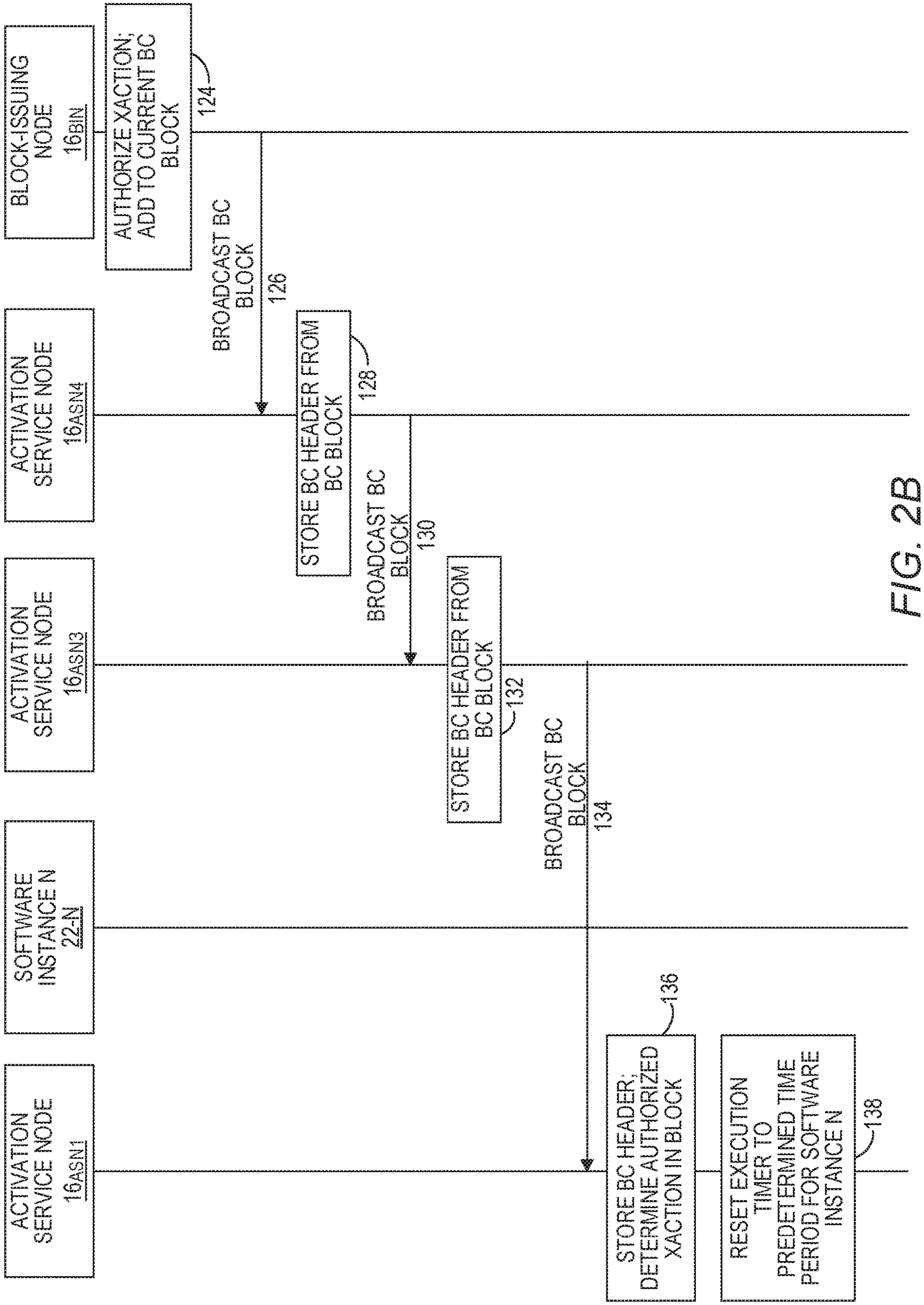

With this context of the environment 10, reference will now be made to FIGS. 2A and 2B, which are message flow diagrams illustrating an example mechanism for granting an authorization request transaction according to one example. FIGS. 2A and 2B will be discussed in conjunction with FIG. 1. Referring now to FIG. 2A, as the activation service node $\mathbf{16}_{ASN1}$ initiates, the activation service node $\mathbf{16}_{ASN1}$ broadcasts a blockchain headers request (step 100). In this example, assume that the activation service node $\mathbf{16}_{ASN1}$ broadcasts the blockchain headers request to the activation service node $\mathbf{16}_{ASN3}$, which in turn broadcasts the blockchain headers request to the activation service node $\mathbf{16}_{ASN4}$ (step 102). The activation service node $\mathbf{16}_{ASN4}$ broadcasts the blockchain headers request to the block-issuing node $\mathbf{16}_{BIN}$ (step 104). Note that while FIG. 2A illustrates the blockchain headers request as traversing two activation service nodes $\mathbf{16}_{ASN3}$ and $\mathbf{16}_{ASN4}$ prior to reaching the block-issuing node $\mathbf{16}_{BIN}$, in operation the blockchain headers request may traverse any number of activation service nodes $\mathbf{16}_{ASN}$ prior to reaching the block-issuing node $\mathbf{16}_{BIN}$, or, alternatively, the block-issuing node $\mathbf{16}_{BIN}$ may be in the broadcast list of the activation service node $\mathbf{16}_{ASN1}$ and may receive the blockchain headers request directly from the activation service node $\mathbf{16}_{ASN1}$.

The block-issuing node $\mathbf{16}_{BIN}$ generates the blockchain headers from the blockchain 18, and broadcasts the blockchain headers, which may follow the reverse path through the activation service nodes $\mathbf{16}_{ASN4}$ and $\mathbf{16}_{ASN3}$ before being received by the activation service node $\mathbf{16}_{ASN1}$, or, may traverse different activation service nodes $\mathbf{16}_{ASN}$ before reaching the activation service node $\mathbf{16}_{ASN1}$ (steps 106-110). The activation service node $\mathbf{16}_{ASN1}$ stores the blockchain headers (step 112). Assume that the software instance 22-N now initiates. Upon initiation the software instance 22-N sends a request for activation to the activation service node $\mathbf{16}_{ASN1}$ (step 114). The activation service node $\mathbf{16}_{ASN1}$ accesses the grace period 24 and sets the execution timer 26 associated with the software instance 22-N to grace period 24. The activation service node $\mathbf{16}_{ASN1}$ also generates an activation request transaction that seeks authorization for the software instance 22-N. The activation request transaction may identify the activation service node $\mathbf{16}_{ASN1}$, the software instance 22-N, a software instance type of the software instance 22-N, and may also request a particular execution time, such as 1 hour, 2 hours, or the like. The activation service node $\mathbf{16}_{ASN1}$ may also authenticate the activation request transaction, such as via a digital signature, an encryption key, or the like (step 116).

The activation service node $\mathbf{16}_{ASN1}$ broadcasts the activation request transaction (step 118). Again assume that the activation service node $\mathbf{16}_{ASN1}$ broadcasts the activation request transaction to the activation service node $\mathbf{16}_{ASN3}$, which in turn broadcasts the activation request transaction to the activation service node $\mathbf{16}_{ASN4}$ (step 120). The activation service node $\mathbf{16}_{ASN4}$ broadcasts the activation request transaction to the block-issuing node $\mathbf{16}_{BIN}$ (step 122). In some examples, each activation service node $\mathbf{16}_{ASN}$ maintains an in-memory list of activation request transactions that the respective activation service node $\mathbf{16}_{ASN}$ has generated, as well as those received from other activation service nodes $\mathbf{16}_{ASN}$. As an activation service node $\mathbf{16}_{ASN}$ receives a blockchain block that contains authorized transactions, the activation service node $\mathbf{16}_{ASN}$ may remove from its in-memory list those activation request transactions that correspond to the authorized transactions in the blockchain block.

The block-issuing node 16$_{BIN}$ receives the activation request transaction and, based on one or more criterion, determines whether or not the activation request transaction should be authorized. Such criterion may be system- or customer-dependent and may be based on, for example, one or more of a total number of authorized activation request transactions, a type of the software instance 22-N, or the like. In some examples, as will be discussed in greater detail below, the criterion may be based on current and/or past software usage and a predetermined allotment for software usage. For example, if the authorization of the activation request transaction would result in exceeding a predetermined allotment, the block-issuing node 16$_{BIN}$ may deny the activation request transaction.

For purposes of illustration, assume that the block-issuing node 16$_{BIN}$ authorizes the activation request transaction, generates an authorized transaction, and adds the authorized transaction to a pending blockchain block (step 124). The activation request transaction may include certain information, such as the date and time that the authorized transaction was generated, the software instance type, and an amount of time that the software instance 22 is permitted to execute before requesting a renewal. The pending blockchain block may not yet be committed to the blockchain 18. The block-issuing node 16$_{BIN}$ may wait until a predetermined length of time has elapsed before committing the pending blockchain block to the blockchain 18, or, if the pending blockchain block becomes full with authorized transactions, may commit the pending blockchain block to the blockchain 18 early if the consensus method allows. The time span between blocks may also be based on the particular consensus protocol used by the block-issuing nodes 16$_{BIN}$ in the network. For example, for a "proof of work" consensus protocol, block issuing time spans may average approximately 10 minutes, but any individual time span could vary, for example, from one minute to one hour. For a "proof of stake" consensus protocol, the time span may be predetermined. For a "proof of elapsed time" consensus protocol, the time span between blocks may be similar to that in the "proof of work" consensus protocol.

In some examples, the block-issuing node 16$_{BIN}$ generates a hash for each block that is in part based on the hash of the previous block in the blockchain 18, making it impossible, or at least impractical, to subsequently alter a block without having to alter every block since the beginning of the blockchain 18. Moreover, in some examples, the block-issuing node 16$_{BIN}$ utilizes a proof-of-work protocol, or similar protocol, to generate blocks. The proof-of-work protocol, or similar protocol, makes the generation of false or intentionally erroneous blocks impossible, or at least impracticable.

Examples of other suitable consensus protocols include, but are not limited to, the "proof of stake" consensus protocol and the "proof of elapsed time" consensus protocol. Such consensus protocols, when operated properly, offer byzantine fault tolerance, such that a minority of malicious actors can not produce incorrect output that will be committed to the blockchain. This is in part because modifying a previously committed block in the blockchain requires the resources to produce incorrect output in the present, increased by the distance back in time the malicious actor wishes to modify.

After the block-issuing node 16$_{BIN}$ commits the pending blockchain block to the blockchain 18, the block-issuing node 16$_{BIN}$ broadcasts the blockchain block (step 126). In this example, assume again that the broadcast of the blockchain block includes sending the blockchain block to the activation service node 16$_{ASN4}$. The activation service node 16$_{ASN4}$ stores the blockchain header from the blockchain block (step 128). The activation service node 16$_{ASN4}$ also analyzes the blockchain block to determine if the blockchain block contains any authorized transactions that correspond to activation request transactions broadcast by the activation service node 16$_{ASN4}$. The activation service node 16$_{ASN4}$ broadcasts the blockchain block, which in this example includes sending it to the activation service node 16$_{ASN3}$ (step 130). The activation service node 16$_{ASN3}$ stores the blockchain header from the blockchain block (step 132). The activation service node 16$_{ASN3}$ also analyzes the blockchain block to determine if the blockchain block contains any authorized transactions that correspond to activation request transactions broadcast by the activation service node 16$_{ASN3}$.

The activation service node 16$_{ASN3}$ broadcasts the blockchain block, which, in this example, includes sending it to the activation service node 16$_{ASN1}$ (step 134). The activation service node 16$_{ASN1}$ stores the blockchain header from the blockchain block. The activation service node 16$_{ASN1}$ also determines that the blockchain block contains an authorized transaction that corresponds to the activation request transaction associated with the request for activation of the software instance 22-N (step 136). In response, the activation service node 16$_{ASN1}$ resets the execution timer of the software instance 22-N to a predetermined time period that is greater than the grace period 24 (step 138). The activation service node 16$_{ASN1}$ also broadcasts the blockchain block.

The grace period 24 provides a length of time for which a software instance 22, such as the software instance 22-N, can execute prior to authorization by the block-issuing node 16$_{BIN}$ to eliminate a need for the software instance 22-N to delay execution until authorized. If the software instance 22-N was not authorized within the grace period, the execution timer 26 would expire, and the activation service node 16$_{ASN1}$ would direct the software instance 22-N to terminate. However, the grace period 24 also represents a period of time in which the software instance 22-N executes without authorization, and thus could be exploited to knowingly obtain services from a software instance 22 that will not be authorized. In a computing-on-demand service, such as in a cloud computing infrastructure, the grace period 24 could be used to knowingly obtain services from hundreds or thousands of software instances 22 without authorization.

While for purposes of illustration the environment 10 has been discussed in conjunction with the grace period 24, the examples have applicability in environments where no grace period is provided. For example, in such environments, a software instance 22 may simply wait for authorization to proceed.

Figure 3:
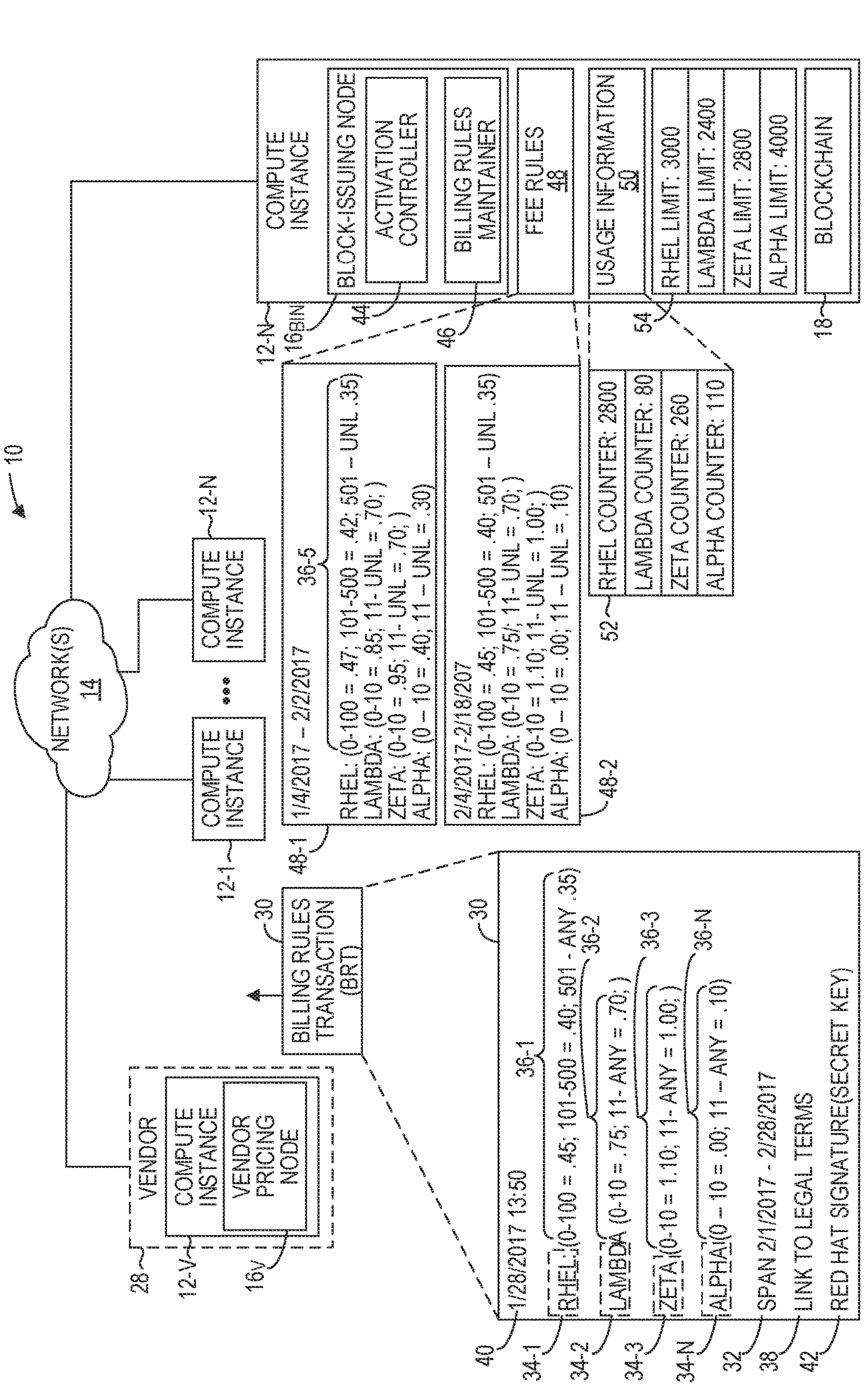
FIG. 3 is a block diagram of the environment illustrated in FIG. 1 that illustrates certain aspects in greater detail.

FIG. 3 is a block diagram of the environment 10 illustrating certain aspects in greater detail. Certain components of the environment 10 illustrated in FIG. 1 have been omitted in FIG. 3 solely for the sake of clarity. In this example, a software vendor 28 has an associated compute instance 12-V. The compute instance 12-V includes a vendor pricing node 16$_V$. Periodically, or intermittently, the vendor pricing node 16$_V$ may generate a billing rules transaction 30. The billing rules transaction 30 may include an effective span 32 during which the billing rules transaction 30 is effective. In one example, the effective span 32 may be a timeframe, such as, in this example, the timeframe of Feb. 1, 2017-Feb. 28, 2017. Thus, any authorized transactions generated and stored in the blockchain 18 between Feb. 1, 2017 and Feb. 28, 2017 are subject to the terms and conditions of the billing rules transaction 30. In other examples, where the vendor pricing node $\mathbf{16}_v$ may have direct access to the blockchain 18, the effective span 32 may be based on particular future blockchain block numbers. For example, if the blockchain 18 is currently at blockchain block number 1200, then the effective span 32 may be from block 1300-block 1500. Thus, any authorized transactions generated and stored in blockchain blocks 1300 through blockchain blocks 1500 may be subject to the terms and conditions of the billing rules transaction 30.

The billing rules transaction 30 may also include one or more software instance types 34-1-34-N (generally, software instance types 34). In this example, the software instance types 34 are RHEL, LAMBDA, ZETA, and ALPHA. The billing rules transaction 30 may also include a fee 36-1-36-N (generally, fees 36) associated with execution of software instances of the software instance types 34. A particular fee 36 may be based on any of a number of different criteria, such as a time-based criteria, a quantity-based criteria, a combination of time- and quantity-based criteria, or the like. The fee 36 may differ over the effective span 32, such as being lower at times of the day, such as early morning hours, when processor utilization may generally be lower to encourage execution of software instances 22 during such times. In this example, the fee 36-1, which applies to software instances 22 of software instance type RHEL, is based on cumulative, or aggregate, execution time of software instances 22. The first 100 minutes of execution time are charged at 45 cents per minute, the next 400 minutes (minute 101-minute 500) at 40 cents per minute, and every minute thereafter at 35 cents per minute.

The billing rules transaction 30 may also include legal terms and conditions, or a reference 38 to such legal terms and conditions, associated with the software instance types 34. The billing rules transaction 30 may include a timestamp 40 that identifies the time and date of creation of the billing rules transaction 30. The billing rules transaction 30 may also contain a digital signature 42, or alternatively or supplementally, the contents of the billing rules transaction 30 may be encrypted by a digital key associated with the vendor 28.

The compute instance 12-V broadcasts, or otherwise communicates, the billing rules transaction 30 to the block-issuing node $\mathbf{16}_{BIN}$. The block-issuing node $\mathbf{16}_{BIN}$ includes an activation controller 44 and a billing rules maintainer 46. The billing rules maintainer 46 maintains fee rules 48 that identify fees associated with the execution of software instances 22 of different software instance types 34 based on the content of billing rules transactions 30 received periodically, or intermittently, from the compute instance 12-V associated with the vendor 28. Upon receipt of the billing rules transaction 30, the billing rules maintainer 46 may first verify, using an encryption key, that the billing rules transaction 30 was generated by the vendor 28. In particular, the billing rules maintainer 46 may access a public key associated with the vendor 28 and determine that the signature 42 was signed by the matching private key, or, if the contents of the billing rules transaction 30 are encrypted, that the public key associated with the vendor 28 properly decrypts the contents of the billing rules transactions 30.

The billing rules maintainer 46 also stores the software instance types 34, the effective span 32, and the fees 36 in the fee rules 48 for use by the activation controller 44, as discussed in greater detail below. Note that the billing rules transaction 30 will typically identify fees for a future span. Thus, the fee rules 48 may contain both a current fee rules 48-1 and a future fee rules 48-2. Upon the beginning of the future span, the current fee rules 48-1 may be removed. The block-issuing node $\mathbf{16}_{BIN}$ stores the billing rules transaction 30 in a block of the blockchain 18 to record the billing rules transaction 30. Each block added to the blockchain 18 may contain a hash of the immediately preceding block in the blockchain 18, and may be added by the block-issuing node $\mathbf{16}_{BIN}$ using a protocol, such as a proof-of-work protocol, that eliminates, or substantially inhibits, the ability to subsequently alter blocks that have been stored in the blockchain 18.

Upon receipt of an activation request transaction, the activation controller 44 may determine from the activation request transaction the software instance type 34 of the software instance 22 associated with the activation request transaction. The activation controller 44 may then access the appropriate fee rules 48 that are in effect for the current span to determine the fee 36 associated with the respective software instance type 34. The activation controller 44 may access a counter in usage information 50 to obtain information suitable for determining a current usage fee accumulated during the current span for software instances 22 of the particular software instance type 34. The counter may, for example, maintain a running tally of the minutes of execution of the software instances 22, or a running tally of the number of software instances 22, or whatever other information is necessary to determine a current usage fee associated with the software instances 22 of a particular software instance type 34 based on the particular fees 36 in effect.

For example, assume that the software instance type 34 of the software instance 22 associated with the activation request transaction is a RHEL software instance type 34-1. The activation controller 44 may access a counter 52 associated with the RHEL software instance type 34-1 to determine cumulative fee usage information 50. In this example, the counter 52 maintains a running tally of the total number of minutes that software instances 22 of the RHEL software instance type 34-1 have been executing within the span. This may be based on, for example, a default or predetermined time period, such as 10 minutes, 30 minutes, 100 minutes, or the like that each software instance 22 of the RHEL software instance type 34-1 is permitted to execute prior to requesting a renewal time period in a new activation request transaction. In some examples, this time period may also be identified in each authorized transaction stored in the blockchain 18.

The activation controller 44 accesses the counter 52 and a fee 36-5 of the current fee rules 48-1 that identifies the fees that are currently in effect for software instances 22 of the RHEL software instance type 34-1. The activation controller 44 determines, based on the counter 52 and the fee 36-5, a current accumulated amount associated with execution of software instances 22 of the RHEL software instance type 34-1. As an example, the counter 52 indicates that software instances 22 of the RHEL software instance type 34-1 have been authorized to execute for a total of 2800 minutes. The fee 36-5 indicates that the first 100 minutes are to be charged at 47 cents per minute, the next 400 minutes at 42 cents per minute, and each minute thereafter at 35 cents per minute. Thus, the activation controller 44 determines that the current accumulated usage fee is $1020 ((0.47*100)+(0.42*400)+(2300*0.35)). The activation controller 44 then adds to the current accumulated amount the amount of increase if the activation request transaction is authorized. In this example, assume that the default or predetermined time period that a software instance 22 of the RHEL software instance type 34-1 is permitted to execute prior to requesting a renewal time period is 100 minutes. The activation controller 44 thus adds 35 (100*0.35) to the current accumulated amount of $1020 to derive a potential accumulated amount that identifies what the current accumulated amount will be if the activation request transaction is authorized.

The activation controller 44 may then access a predetermined limit 54 associated with software instances 22 of the RHEL software instance type 34-1, and compare the potential accumulated amount to the predetermined limit 54. If the potential accumulated amount is less than the predetermined limit 54, the activation controller 44 authorizes the authorization request transaction. The block-issuing node $\mathbf{16}_{BIN}$ may then store an authorized transaction in a block that identifies the software instance type 34-1, the default or predetermined time period of 100 minutes, and a timestamp 40 that identifies the time of generation of the authorized transaction. The block-issuing node $\mathbf{16}_{BIN}$ also broadcasts the authorized transaction to the network 14. If the potential accumulated amount is greater than the predetermined limit 54, the activation controller 44 denies the authorization request transaction. This process may be implemented by the activation controller 44 for each activation request transaction received by the block-issuing node $\mathbf{16}_{BIN}$.

Figure 4:
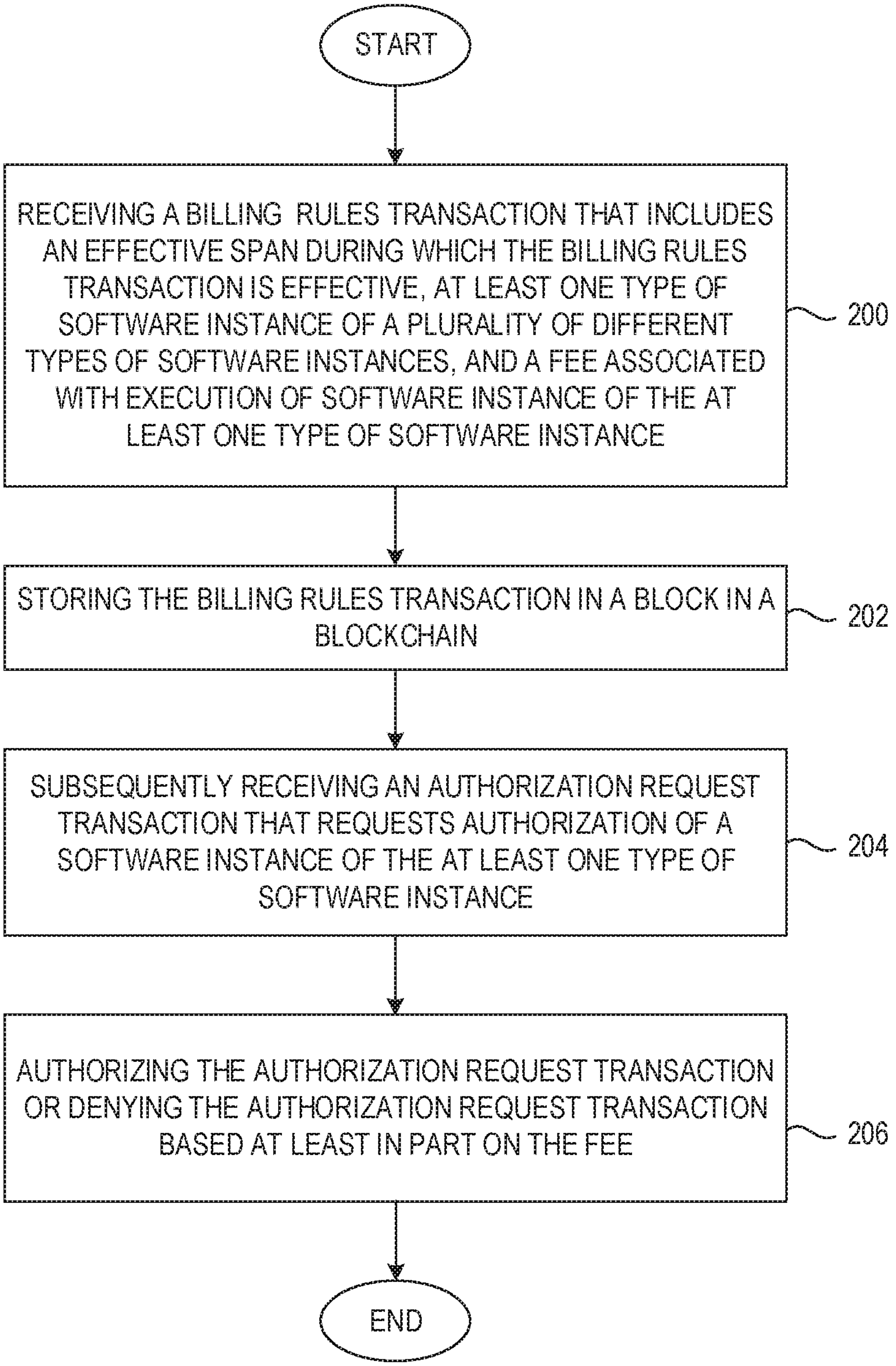
FIG. 4 is a flowchart of a method for authorizing or denying an authorization request transaction according to one example.

FIG. 4 is a flowchart of a method for authorizing or denying an authorization request transaction according to one example. FIG. 4 will be discussed in conjunction with FIG. 3. The block-issuing node $\mathbf{16}_{BIN}$ receives a billing rules transaction 30 that includes the effective span 32 during which the billing rules transaction 30 is effective, at least one software instance type 34 of a plurality of different types of software instance types 34, and a fee 36 associated with execution of a software instance 22 of the at least one software instance type 34 (FIG. 4, block 200). The block-issuing node $\mathbf{16}_{BIN}$ stores the billing rules transaction 30 in a block in the blockchain 18 (FIG. 4, block 202). The block-issuing node $\mathbf{16}_{BIN}$ subsequently receives an authorization request transaction that requests authorization of a software instance 22 of the at least one software instance type 34 (FIG. 4, block 204). The block-issuing node $\mathbf{16}_{BIN}$ either authorizes the authorization request transaction or denies the authorization request transaction based at least in part on the fee 36 (FIG. 4, block 206).

Figure 5:
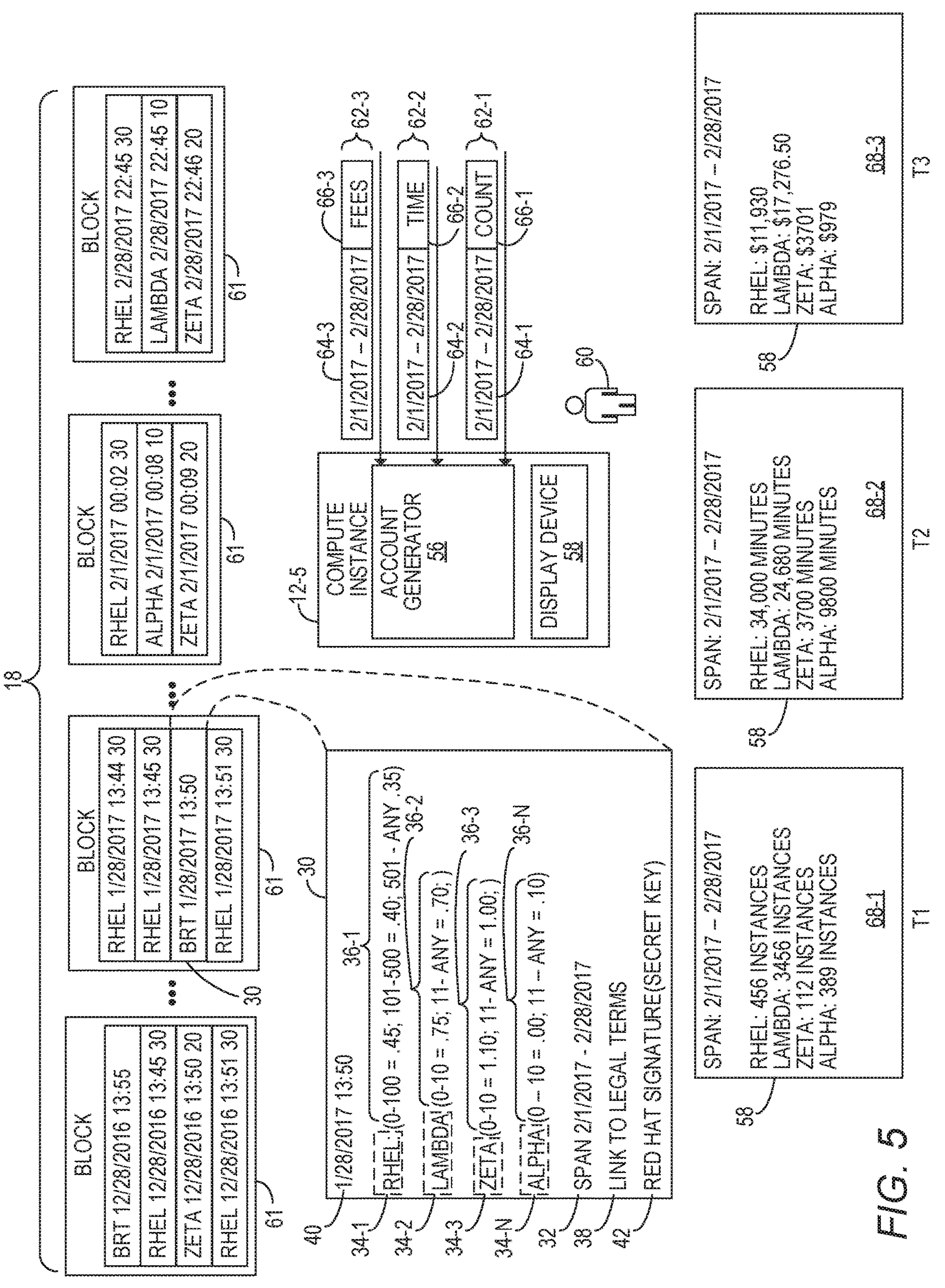
FIG. 5 is a block diagram of an account generator that is configured to access a blockchain to obtain software instance usage information according to some examples.

FIG. 5 is a block diagram of an account generator 56 that is configured to access the blockchain 18 to obtain software instance usage information according to some examples. The account generator 56 may be a component of a compute instance 12-5 which also includes a display device 58. The account generator 56 accesses the blockchain 18, portions of which are illustrated in FIG. 5, and determines software instance usage in response to an input. The input may be received, for example, from a file, another component, or a user 60, for example. The blockchain 18 includes a plurality of blocks 61, each of which includes a billing rules transaction 30, or authorized transactions, or both. The authorized transactions may, for example, each identify a software instance type 34, a date and time the software instance 22 of that software instance type 34 executed, and the amount of time, in minutes, such as 30, 20, or 10 in this example, that the software instance 22 was permitted to execute prior to seeking a renewal.

As an example, assume that the user 60 enters an input 62-1 to the account generator 56 that includes a span identifier 64-1 and an action 66-1. The span identifier 64-1 identifies a span that comprises a timeframe from Feb. 1, 2017 to Feb. 28, 2017, and the action 66-1 is an instruction to determine the quantity and software instance types 34 of software instances 22 that were authorized over the span. Based on the input 62-1, the account generator 56 accesses the blockchain 18, traverses each block 61 containing authorized transactions within the identified span that authorize a software instance 22 of a particular software instance type 34, and determines information 68-1 that includes a count of each software instance 22 of each particular software instance type 34. The account generator 56 may then output the information 68-1 on, for example, the display device 58 at a time T1.

In another example, the user 60 enters an input 62-2 to the account generator 56 that includes a span identifier 64-2 and an action 66-2. The span identifier 64-2 identifies a span that comprises a timeframe from Feb. 1, 2017 to Feb. 28, 2017, and the action 66-2 is an instruction to determine the amount of time the software instances 22 of each software instance type 34 executed over the span. Based on the input 62-2, the account generator 56 accesses the blockchain 18, traverses each block 61 containing authorized transactions within the identified span that authorize a software instance 22 of a particular software instance type 34, and determines information 68-2 that includes a cumulative amount of time each software instance 22 of each particular software instance type 34 executed within the span. The account generator 56 may then output the information 68-2 on, for example, the display device 58 at a time T2.

In another example, the user 60 enters an input 62-3 to the account generator 56 that includes a span identifier 64-3 and an action 66-3. The span identifier 64-3 identifies a span that comprises a timeframe from Feb. 1, 2017 to Feb. 28, 2017, and the action 66-3 is an instruction to determine the fees associated with the execution of software instances 22 over the span. Based on the input 62-3, the account generator 56 accesses the blockchain 18 to locate the billing rules transaction, or billing rules transactions, that have an effective span that covers the span from Feb. 1, 2017 to Feb. 28, 2017. In this example, the account generator 56 determines that the billing rules transaction 30 has the effective span 32 that covers the span from Feb. 1, 2017 to Feb. 28, 2017. The account generator 56 then traverses each block 61 containing authorized transactions within the identified span that authorize a software instance 22 of a particular software instance type 34, and sums the amount of time each software instance 22 of each software instance type 34 executed within the span. Based on the fees 36-1-36-N from the billing rules transaction 30, the account generator 56 generates information 68-3 that includes cumulative fee information for each software instance type 34 executed within the span. The account generator 56 may then output the information 68-3 on, for example, the display device 58 at a time T3.

In this manner, the blockchain 18 stores, or records, both the applicable fee information and the software instance usage information in a reliable manner that cannot be manipulated by either party.

Figure 6:
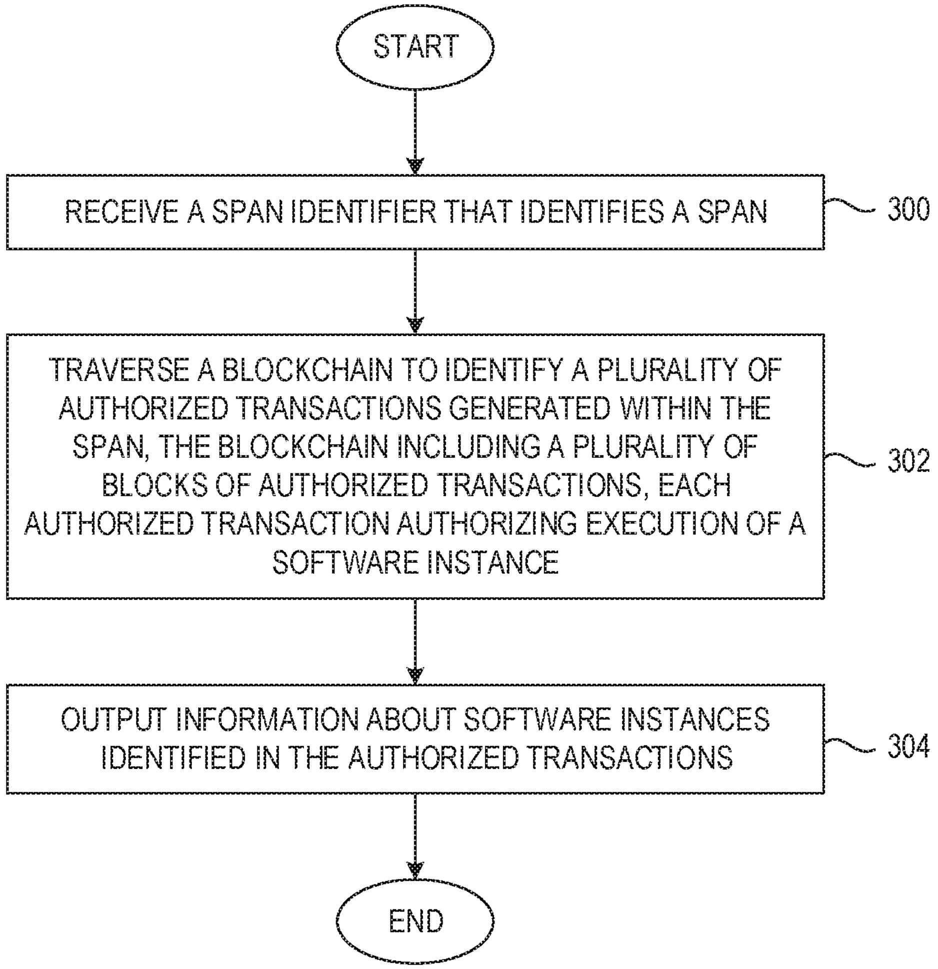
FIG. 6 is a flowchart of a method for generating an accounting of software instance usage according to one example.

FIG. 6 is a flowchart of a method for generating an accounting of software instance usage according to one example. FIG. 6 will be discussed in conjunction with FIG. 5. The account generator 56 receives a span identifier that identifies a span (FIG. 6, block 300). The account generator 56 traverses the blockchain 18 to identify a plurality of authorized transactions generated within the span. The blockchain 18 includes a plurality of blocks of authorized transactions, each authorized transaction authorizing execution of a software instance 22 (FIG. 6, block 302). The account generator 56 outputs information about software instances 22 identified in the plurality of authorized transactions (FIG. 6, block 304).

Figure 7:
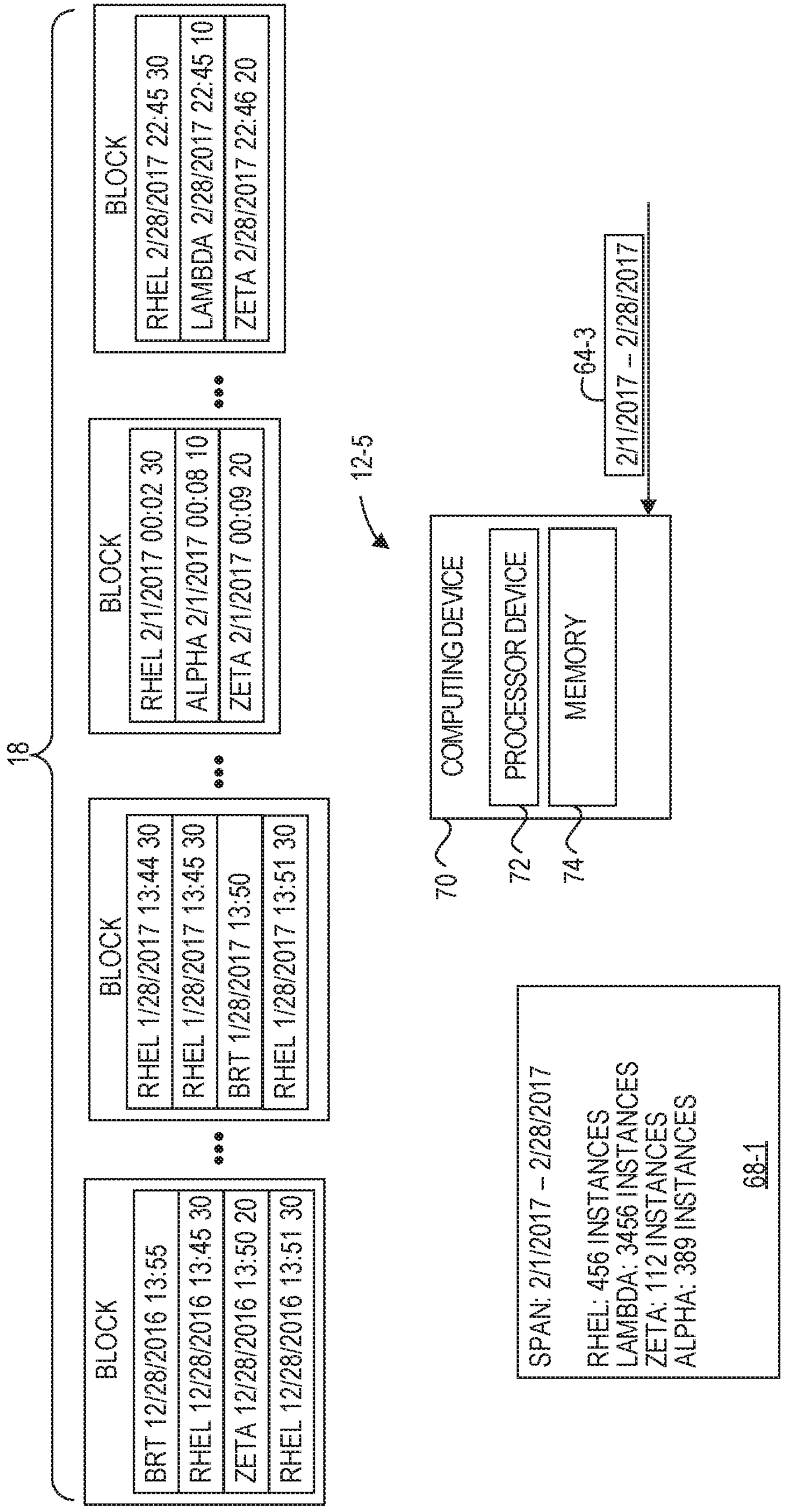
FIG. 7 is a block diagram of a compute instance according to one example.

FIG. 7 is a block diagram of the compute instance 12-5 according to one example. The compute instance 12-5 includes a computing device 70. The computing device 70 includes a processor device 72 and a memory 74. In this example, the account generator 56 (FIG. 5) is a component of the computing device 70, and thus, functionality implemented by the account generator 56 may be attributed to the computing device 70 generally. Moreover, in examples where the account generator 56 comprises software instructions that program the processor device 72 to carry out functionality discussed herein, functionality implemented by the account generator 56 may be attributed herein to the processor device 72. The processor device 72 is coupled to the memory 74 and receives the span identifier 64-3 that identifies a span of Feb. 1, 2017 to Feb. 28, 2017. The processor device 72 traverses the blockchain 18 to identify a plurality of authorized transactions generated within the span. The blockchain 18 comprises a plurality of blocks of authorized transactions, and each authorized transaction authorizes execution of a software instance 22. The processor device 72 outputs the information 68-1 about software instances 22 identified in the authorized transactions.

Figure 8:
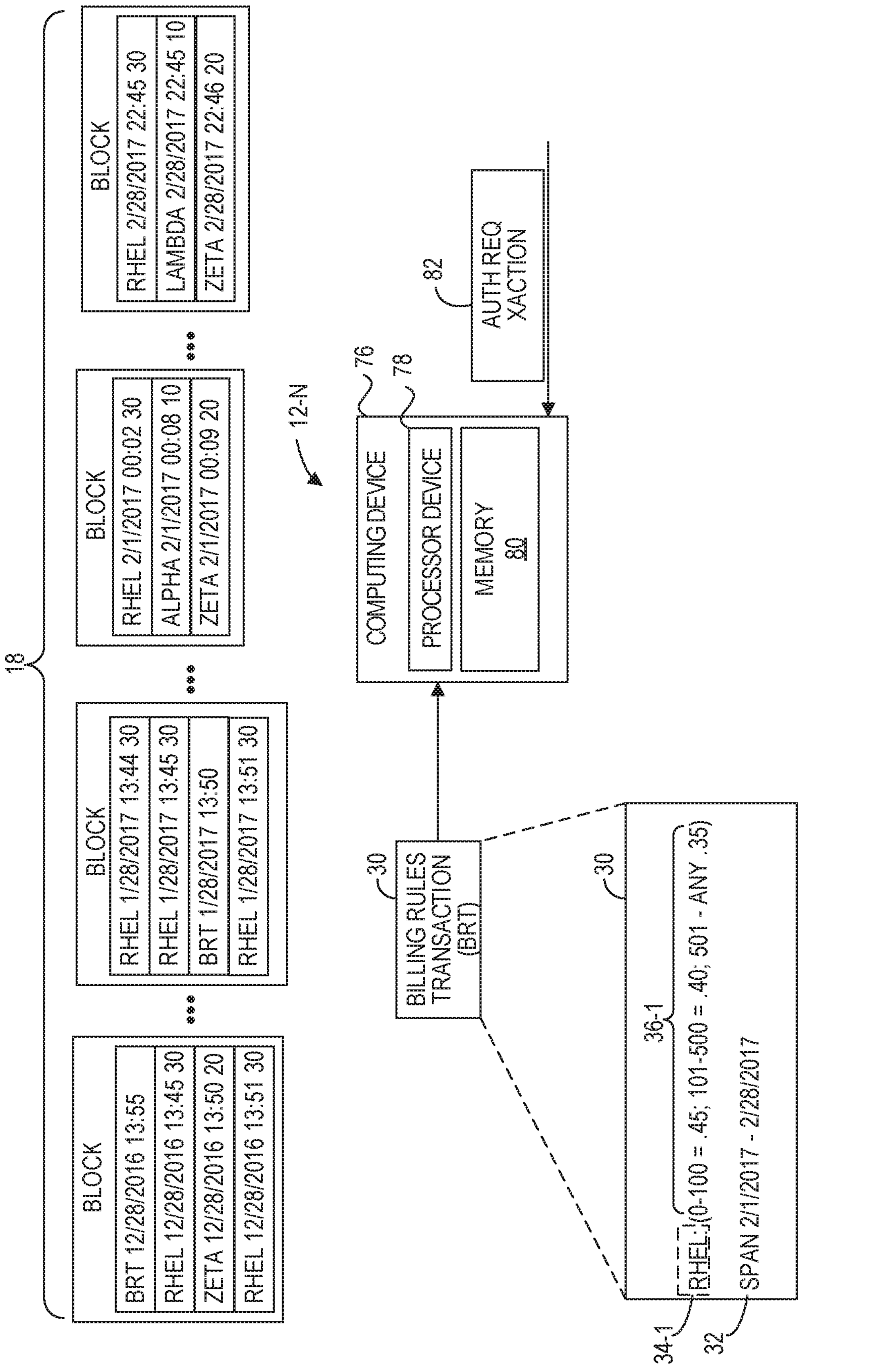
FIG. 8 is a block diagram of a compute instance according to another example.

FIG. 8 is a block diagram of the compute instance 12-N according to one example. The compute instance 12-N includes a computing device 76. The computing device 76 includes a processor device 78 and a memory 80. In this example, the block-issuing node $\mathbf{16}_{BIN}$ is a component of the computing device 76, and thus, functionality implemented by the block-issuing node $\mathbf{16}_{BIN}$ may be attributed to the computing device 76 generally. Moreover, in examples where the block-issuing node $\mathbf{16}_{BIN}$ comprises software instructions that program the processor device 78 to carry out functionality discussed herein, functionality implemented by the block-issuing node $\mathbf{16}_{BIN}$ may be attributed herein to the processor device 78. The processor device 78 is coupled to the memory 80 and receives the billing rules transaction 30. The billing rules transaction 30 includes the effective span 32 during which the billing rules transaction 30 is effective. The billing rules transaction 30 also includes the at least one software instance type 34-1 of a plurality of different software instance types 34, and includes the fee 36-1 associated with execution of a software instance of the least one software instance type 34-1. The processor device 78 stores the billing rules transaction 30 in a block in the blockchain 18. The blockchain 18 includes blocks of authorized transactions. Subsequent to storing the billing rules transaction, the processor device 78 receives a first authorization request transaction 82 that requests authorization of a first software instance of the at least one software instance type 34-1. The processor device 78 authorizes the authorization request transaction 82 or denies the authorization request transaction 82 based at least in part on the fee 36-1.

Figure 9:
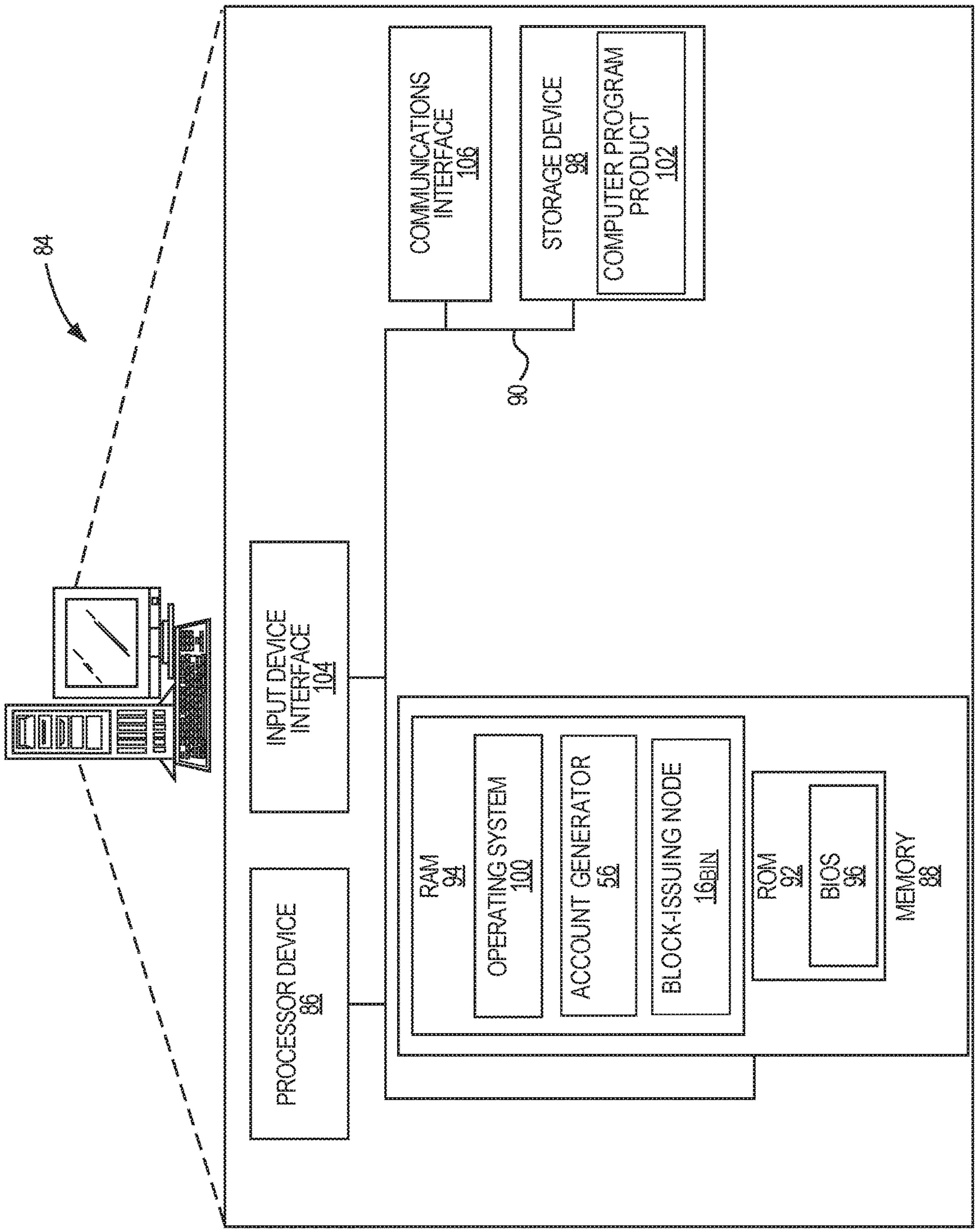
FIG. 9 is a block diagram of a computing device according to some examples.

FIG. 9 is a block diagram of a computing device 84 that is suitable to implement either of the computing devices 70 or 76 according to some examples. The computing device 84 may comprise any computing or electronic device capable of including firmware, hardware, and/or executing software instructions to implement the functionality described herein, such as a computer server, a desktop computing device, a laptop computing device, or the like. The computing device 84 includes a processor device 86, a system memory 88, and a system bus 90. The system bus 90 provides an interface for system components including, but not limited to, the system memory 88 and the processor device 86. The processor device 86 can be any commercially available or proprietary processor.

The system bus 90 may be any of several types of bus structures that may further interconnect to a memory bus (with or without a memory controller), a peripheral bus, and/or a local bus using any of a variety of commercially available bus architectures. The system memory 88 may include non-volatile memory 92 (e.g., read-only memory (ROM), erasable programmable read-only memory (EPROM), electrically erasable programmable read-only memory (EEPROM), etc.), and volatile memory 94 (e.g., random-access memory (RAM)). A basic input/output system (BIOS) 96 may be stored in the non-volatile memory 92 and can include the basic routines that help to transfer information between elements within the computing device 84. The volatile memory 94 may also include a high-speed RAM, such as static RAM, for caching data.

The computing device 84 may further include or be coupled to a non-transitory computer-readable storage medium such as a storage device 98, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 98 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of processes can be stored in the storage device 98 and in the volatile memory 94, including an operating system 100 and one or more program modules, such as the block-issuing node $\mathbf{16}_{BIN}$, and/or the account generator 56, which may implement the functionality described herein in whole or in part.

All or a portion of the examples may be implemented as a computer program product 102 stored on a transitory or non-transitory computer-usable or computer-readable storage medium, such as the storage device 98, which includes complex programming instructions, such as complex computer-readable program code, to cause the processor device 86 to carry out the steps described herein. Thus, the computer-readable program code can comprise software instructions for implementing the functionality of the examples described herein when executed on the processor device 86. The processor device 86, in conjunction with the block-issuing node $\mathbf{16}_{BIN}$, and/or the account generator 56 in the volatile memory 94, may serve as a controller, or control system, for the computing device 84 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 86 through an input device interface 104 that is coupled to the system bus 90 but can be connected by other interfaces such as a parallel port, an Institute of Electrical and Electronic Engineers (IEEE) 1394 serial port, a Universal Serial Bus (USB) port, an IR interface, and the like.

The computing device 84 may also include a communications interface 106 suitable for communicating with the network 14 or other network as appropriate or desired.

The following are additional examples. Example 1 is a method that comprises receiving, by a computing device comprising a processor device, a billing rules transaction that comprises: an effective span during which the billing rules transaction is effective; at least one software instance type of a plurality of different software instance types; and a fee associated with execution of a software instance of the at least one software instance type; storing the billing rules transaction in a block in a blockchain, the blockchain comprising blocks of authorized transactions; subsequent to storing the billing rules transaction, receiving a first authorization request transaction that requests authorization of a first software instance of the at least one software instance type; and authorizing the first authorization request transaction or denying the first authorization request transaction based at least in part on the fee.

Example 2 is the method of Example 1 further comprising: receiving a second authorization request transaction that requests authorization of a second software instance of the at least one software instance type; determining an accumulated usage fee over the effective span based on the billing rules transaction and a plurality of authorizations of authorization request transactions; determining that an authorization of the second authorization request transaction would exceed a predetermined limit based on the accumulated usage fee; and denying the second authorization request transaction.

Example 3 is the method of Example 1 further comprising verifying, based on an encryption key, that the billing rules transaction was generated by an entity permitted to generate the billing rules transaction.

Example 4 is a computing device comprising: a memory; and a processor device coupled to the memory to: receive a billing rules transaction that comprises: an effective span during which the billing rules transaction is effective; at least one software instance type of a plurality of different software instance types; and a fee associated with execution of a software instance of the at least one software instance type; store the billing rules transaction in a block in a blockchain, the blockchain comprising blocks of authorized transactions; subsequent to storing the billing rules transaction, receive an authorization request transaction that requests authorization of a software instance of the at least one software instance type; and authorize the authorization request transaction or deny the authorization request transaction based at least in part on the fee.

Example 5 is a computer program product for generating an accounting of software instance usage, the computer program product stored on a non-transitory computer-readable storage medium and including instructions to cause a processor device to: receive a billing rules transaction that comprises: an effective span during which the billing rules transaction is effective; at least one software instance type of a plurality of different software instance types; and a fee associated with execution of a software instance of the at least one software instance type; store the billing rules transaction in a block in a blockchain, the blockchain comprising blocks of authorized transactions; subsequent to storing the billing rules transaction, receive an authorization request transaction that requests authorization of a software instance of the at least one software instance type; and authorize the authorization request transaction or deny the authorization request transaction based at least in part on the fee.

Individuals will recognize improvements and modifications to the preferred examples of the disclosure. All such improvements and modifications are considered within the scope of the concepts disclosed herein and the claims that follow.

What is claimed is:

1. A method for generating an accounting of software instance usage, comprising:

- receiving, by a computing device comprising a processor device, a span identifier that identifies a span;
- traversing, by the computing device, a blockchain to identify a plurality of authorized transactions generated within the span, the blockchain comprising a plurality of blocks of authorized transactions, each authorized transaction authorizing execution of a software instance;
- determining, by the computing device, a plurality of different software instance types authorized in the blockchain within the span;
- determining, by the computing device, a quantity of each software instance of each software instance type that was authorized within the span; and
- outputting, by the computing device, information about software instances identified in the plurality of authorized transactions, the information identifying the quantity of software instances of each software instance type that was authorized within the span.

2. The method of claim 1 further comprising:

- determining an amount of time that each software instance of each software instance type that was authorized within the span was executed; and
- wherein outputting the information further comprises:
  - outputting the information about the software instances, the information identifying for each software instance type an aggregate amount of time software instances executed within the span.

3. The method of claim 1 wherein traversing the blockchain further comprises:

- traversing the blockchain to find at least one billing rules transaction in the plurality of blocks of authorized transactions that is effective within the span, the at least one billing rules transaction identifying:
  - an effective span during which the at least one billing rules transaction is effective;
  - at least one software instance type of the plurality of different software instance types; and
  - a fee associated with execution of a software instance of the at least one software instance type;
- identifying a subset of authorized transactions, each authorized transaction in the subset authorizing execution of a software instance of the at least one software instance type;
- determining cost information of execution for software instances of the at least one software instance type based at least in part on the at least one billing rules transaction and the subset of authorized transactions; and
- wherein the information comprises the cost information.

4. The method of claim 3 wherein determining the cost information further comprises:

- determining, for each authorized transaction, an amount of time of execution of the software instance associated with the authorized transaction;
- summing the amount of time of execution for each software instance to generate a cumulative execution time; and
- based on the at least one billing rules transaction and the cumulative execution time, determining the cost information.

5. The method of claim 1 wherein traversing the blockchain further comprises:

traversing the blockchain to find at least one billing rules transaction in the plurality of blocks of authorized transactions that is effective within the span, the at least one billing rules transaction identifying:

an effective span during which the at least one billing rules transaction is effective;

the plurality of different software instance types; and fees that correspond to each software instance type of the plurality of different software instance types, each fee associated with execution of a software instance of a corresponding software instance type;

identifying, in the blockchain, all authorized transactions that authorized execution of a software instance within the span;

determining cost information for each software instance type based on authorized transactions and fees that correspond to each software instance type; and wherein the information comprises the cost information.

6. The method of claim 1 wherein the span identifier identifies a span of time or a span of blocks in the blockchain.

7. A computing device, comprising:

a memory;

a processor device coupled to the memory to:

receive a span identifier that identifies a span;

traverse a blockchain to identify a plurality of authorized transactions generated within the span, the blockchain comprising a plurality of blocks of authorized transactions, each authorized transaction authorizing execution of a software instance;

determine a plurality of different software instance types authorized in the blockchain within the span;

determine an amount of time that each software instance of each software instance type that was authorized within the span was executed; and output information about software instances identified in the plurality of authorized transactions, the information identifying for each software instance type an aggregate amount of time software instances executed within the span.

8. The computing device of claim 7 wherein the processor device is further to:

determine a quantity of each software instance of each software instance type that was authorized within the span; and output the information about the software instances, the information identifying the quantity of software instances of each software instance type that was authorized within the span.

9. The computing device of claim 7 wherein to traverse the blockchain, the processor device is further to:

traverse the blockchain to find at least one billing rules transaction in the plurality of blocks of authorized transactions that is effective within the span, the at least one billing rules transaction identifying:

an effective span during which the at least one billing rules transaction is effective;

at least one software instance type of the plurality of different software instance types; and a fee associated with execution of a software instance of the at least one software instance type;

identify a subset of authorized transactions, each authorized transaction in the subset authorizing execution of a software instance of the at least one software instance type;

determine cost information for execution of software instances of the at least one software instance type based at least in part on the at least one billing rules transaction and the subset of authorized transactions; and wherein the information comprises the cost information.

10. The computing device of claim 7 wherein to traverse the blockchain, the processor device is further to:

traverse the blockchain to find at least one billing rules transaction in the plurality of blocks of authorized transactions that is effective within the span, the at least one billing rules transaction identifying:

an effective span during which the at least one billing rules transaction is effective;

the plurality of different software instance types; and fees that correspond to each software instance type of the plurality of different software instance types, each fee associated with execution of a software instance of a corresponding software instance type;

identify, in the blockchain, all authorized transactions that authorized execution of a software instance within the span;

determine cost information for each software instance type based on authorized transactions and fees that correspond to each software instance type; and wherein the information comprises the cost information.

11. A computing device, comprising:

a memory; and a processor device coupled to the memory to:

receive a span identifier that identifies a span;

traverse a blockchain to identify a plurality of authorized transactions generated within the span, the blockchain comprising a plurality of blocks of authorized transactions, each authorized transaction authorizing execution of a software instance;

determine a plurality of different software instance types authorized in the blockchain within the span;

determine a quantity of each software instance of each software instance type that was authorized within the span; and output information about software instances identified in the plurality of authorized transactions, the information identifying the quantity of software instances of each software instance type that was authorized within the span.

* * * * *